US012682419B2

(12) United States Patent (10) Patent No.: US 12,682,419 B2
Zhang et al. (45) Date of Patent: Jul. 14, 2026

(54) SUPER-RESOLUTION RECONSTRUCTION METHOD AND APPARATUS FOR ADAPTIVE STREAMING MEDIA AND SERVER

(71) Applicant: SAMSUNG ELECTRONICS CO., LTD., Suwon-si (KR)

(72) Inventors: Ling Zhang, Nanjing (CN); Chuanji Tang, Nanjing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 468 days.

(21) Appl. No.: 18/129,534

(22) Filed: Mar. 31, 2023

(65) Prior Publication Data

US 2023/0342881 A1 Oct. 26, 2023

Related U.S. Application Data

(63) Continuation of application No. PCT/KR2023/003622, filed on Mar. 17, 2023.

(30) Foreign Application Priority Data

Apr. 26, 2022 (CN) .......................... 202210445983.4

(51) Int. Cl.
*G06T 3/4053* (2024.01)
*G06T 3/4046* (2024.01)

(52) U.S. Cl.
CPC .......... *G06T 3/4053* (2013.01); *G06T 3/4046* (2013.01)

(58) Field of Classification Search
CPC ................ G06T 3/4053; G06T 3/4046; H04N 21/234363; H04N 21/23439
See application file for complete search history.

(56) References Cited

U.S. PATENT DOCUMENTS 10,565,684 B2  2/2020 Zhang et al.
11,399,201 B2  7/2022 Han et al.
(Continued)

FOREIGN PATENT DOCUMENTS

CN  110647936 A  1/2020
CN  111080527 A  4/2020
(Continued)

OTHER PUBLICATIONS

International Search Report (PCT/ISA/210) issued Jun. 27, 2023 from the International Searching Authority in International Application No. PCT/KR2023/003622.
(Continued)

*Primary Examiner* — Vu Le
*Assistant Examiner* — Zaid Muhammad Saleh
(74) *Attorney, Agent, or Firm* — Sughrue Mion, PLLC

(57) ABSTRACT

A super-resolution reconstruction method for adaptive streaming of media over a network includes streaming an instance of streamable media to a terminal device via the network, identifying a streaming resolution of the instance of the streamable media based on the streaming resolution being less than a first target super-resolution, acquiring, by the terminal device from a server of the network, a first target super-resolution neural network model corresponding to the identified streaming resolution and the first target super-resolution, reconstructing the instance of the streamable media streamed to the terminal device into an instance of the streamable media at the first target super-resolution using the first target super-resolution neural network model and playing the reconstructed instance of the streamable media by the terminal device, wherein the first target super-resolution neural network model is obtained by performing model training in advance by taking a media at the identified
(Continued)

streaming resolution as an input and taking a media at the first target super-resolution as a learning objective.

16 Claims, 11 Drawing Sheets

(56) References Cited

U.S. PATENT DOCUMENTS

| | | | |
|---|---|---|---|
| 2017/0347061 A1 | 11/2017 | Wang et al. | |
| 2019/0045251 A1* | 2/2019 | Shen | H04L 65/1066 |
| 2019/0206026 A1* | 7/2019 | Vemulapalli | G06T 3/18 |
| 2020/0162789 A1 | 5/2020 | Ma et al. | |
| 2021/0104018 A1 | 4/2021 | Moon et al. | |
| 2021/0160556 A1* | 5/2021 | Jang | G06N 3/0464 |
| 2021/0407042 A1 | 12/2021 | Berthelot et al. | |
| 2022/0383452 A1 | 12/2022 | Lu et al. | |

FOREIGN PATENT DOCUMENTS

| | | | | |
|---|---|---|---|---|
| CN | 113837940 | A | 12/2021 | |
| CN | 113920014 | A | 1/2022 | |
| CN | 114066722 | A | 2/2022 | |
| CN | 114845138 | A | 8/2022 | |
| KR | 10-2019-0119550 | A | 10/2019 | |
| KR | 10-2019-0131205 | A | 11/2019 | |
| KR | 20190130478 | A * | 11/2019 | .......... H04N 21/235 |
| KR | 10-2313136 | B1 | 10/2021 | |
| KR | 10-2022-0021495 | A | 2/2022 | |
| WO | 2021/096063 | A1 | 5/2021 | |
| WO | 2021/163844 | A1 | 8/2021 | |

OTHER PUBLICATIONS

Written Opinion (PCT/ISA/237) issued Jun. 27, 2023 from the International Searching Authority in International Application No. PCT/KR2023/003622.

Communication dated Jan. 9, 2025, issued by the China Patent Office in CN Patent Application No. 202210445983.4.

Communication dated Sep. 30, 2024, issued by the China Patent Office in CN Patent Application No. 202210445983.4.

Communication dated Mar. 29, 2025, issued by the China National Intellectual Property Administration in Chinese Application No. 202210445983.4.

* cited by examiner

FIG. 1A

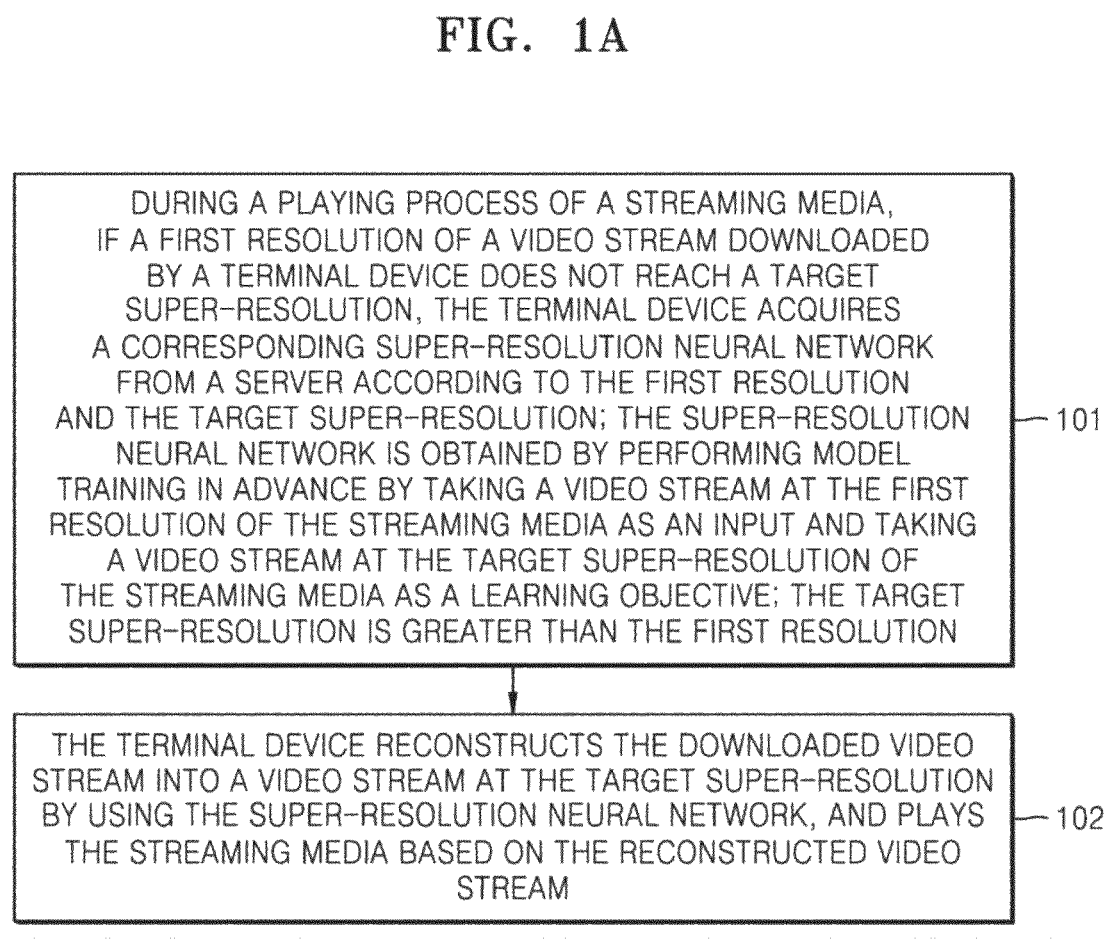

DURING A PLAYING PROCESS OF A STREAMING MEDIA,
IF A FIRST RESOLUTION OF A VIDEO STREAM DOWNLOADED
BY A TERMINAL DEVICE DOES NOT REACH A TARGET
SUPER-RESOLUTION, THE TERMINAL DEVICE ACQUIRES
A CORRESPONDING SUPER-RESOLUTION NEURAL NETWORK
FROM A SERVER ACCORDING TO THE FIRST RESOLUTION
AND THE TARGET SUPER-RESOLUTION; THE SUPER-RESOLUTION
NEURAL NETWORK IS OBTAINED BY PERFORMING MODEL
TRAINING IN ADVANCE BY TAKING A VIDEO STREAM AT THE FIRST
RESOLUTION OF THE STREAMING MEDIA AS AN INPUT AND TAKING
A VIDEO STREAM AT THE TARGET SUPER-RESOLUTION OF
THE STREAMING MEDIA AS A LEARNING OBJECTIVE; THE TARGET
SUPER-RESOLUTION IS GREATER THAN THE FIRST RESOLUTION
— 101

THE TERMINAL DEVICE RECONSTRUCTS THE DOWNLOADED VIDEO
STREAM INTO A VIDEO STREAM AT THE TARGET SUPER-RESOLUTION
BY USING THE SUPER-RESOLUTION NEURAL NETWORK, AND PLAYS
THE STREAMING MEDIA BASED ON THE RECONSTRUCTED VIDEO
STREAM
— 102

FIG. 1B

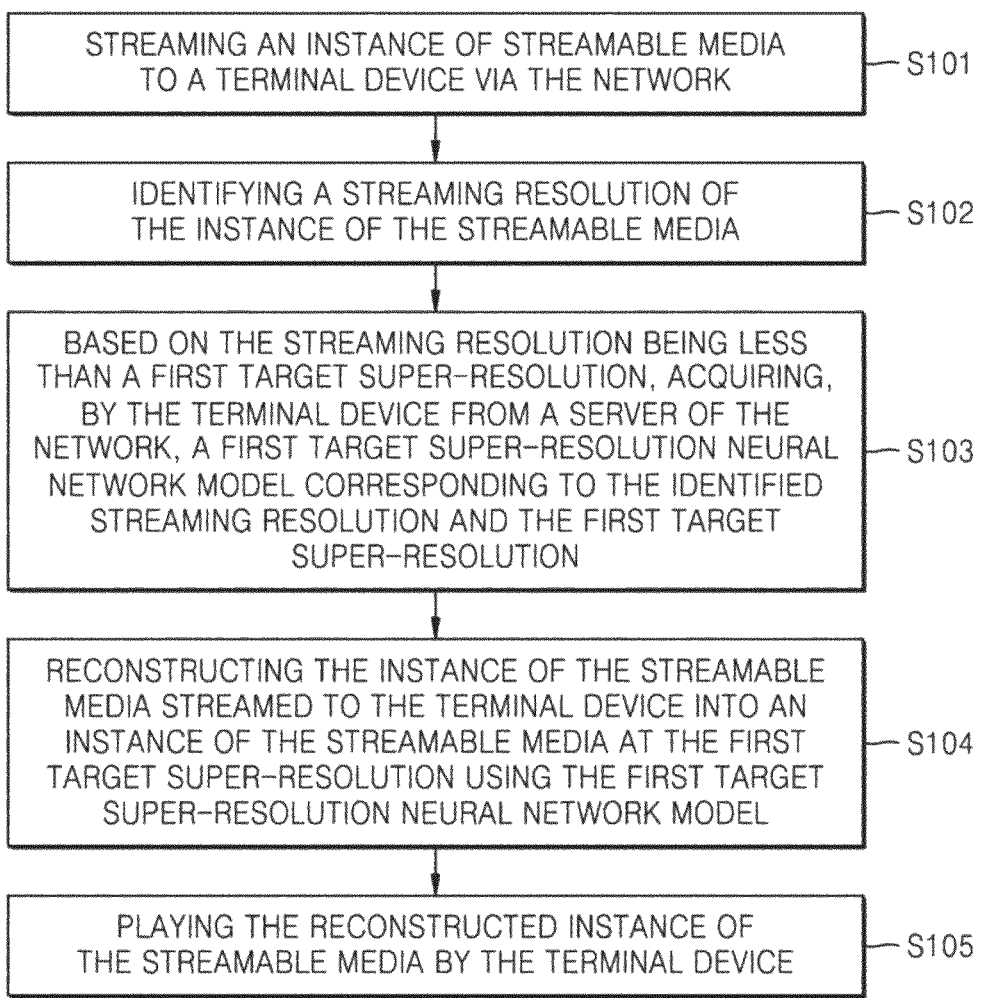

STREAMING AN INSTANCE OF STREAMABLE MEDIA TO A TERMINAL DEVICE VIA THE NETWORK — S101

IDENTIFYING A STREAMING RESOLUTION OF THE INSTANCE OF THE STREAMABLE MEDIA — S102

BASED ON THE STREAMING RESOLUTION BEING LESS THAN A FIRST TARGET SUPER-RESOLUTION, ACQUIRING, BY THE TERMINAL DEVICE FROM A SERVER OF THE NETWORK, A FIRST TARGET SUPER-RESOLUTION NEURAL NETWORK MODEL CORRESPONDING TO THE IDENTIFIED STREAMING RESOLUTION AND THE FIRST TARGET SUPER-RESOLUTION — S103

RECONSTRUCTING THE INSTANCE OF THE STREAMABLE MEDIA STREAMED TO THE TERMINAL DEVICE INTO AN INSTANCE OF THE STREAMABLE MEDIA AT THE FIRST TARGET SUPER-RESOLUTION USING THE FIRST TARGET SUPER-RESOLUTION NEURAL NETWORK MODEL — S104

PLAYING THE RECONSTRUCTED INSTANCE OF THE STREAMABLE MEDIA BY THE TERMINAL DEVICE — S105

FIG. 2A

CONTENT SERVER    CONTENT SERVER    CONTENT SERVER

SUPER-RESOLUTION RECONSTRUCTION METHOD AND APPARATUS FOR ADAPTIVE STREAMING MEDIA AND SERVER

CROSS-REFERENCE TO RELATED APPLICATIONS

This application is a by-pass continuation of International Application No. PCT/KR2023/003622, filed on Mar. 17, 2023, which is based on and claims priority to Chinese Patent Application No. 202210445983.4, filed on Apr. 26, 2022, the disclosures of which are incorporated by reference herein in their entireties.

BACKGROUND

1. Field

The present disclosure relates to a computer application technology, and more particularly, to a super-resolution reconstruction method and apparatus for an adaptive streaming media and a server.

2. Description of Background Art

At present, a dynamic adaptive streaming media transmission technology (such as smooth stream, HLS, and DASH standards) has been widely applied in the field of video playing. This technology may select video streams with different bit rates and resolutions according to different network conditions so as to ensure the smoothness of video playing.

Current systems and methods are unable to ensure video quality while ensuring the smoothness of video playing by using existing playing schemes of dynamic adaptive code streams. The main reason for this problem is that, in order to ensure the smoothness of video playing, existing playing schemes of dynamic adaptive code streams will consider real-time network conditions and control a downloading resolution of a video stream. For example, when the network bandwidth is poor, a low-resolution video may often be selected for playing. Thus, the resolution of a video stream actually downloaded by a user often cannot reach a target playing resolution required by the user, so that the playing quality of video cannot meet the requirements of the user, and when the resolution is switched to a lower resolution, the quality will be obviously reduced, and the viewing experience of the user is reduced.

SUMMARY

A super-resolution reconstruction method and apparatus for an adaptive streaming media and a server is provided, which can improve the quality of video played by an adaptive streaming media.

According to an aspect of the disclosure, a super-resolution reconstruction method for adaptive streaming of media over a network includes: streaming an instance of streamable media to a terminal device via the network; identifying a streaming resolution of the instance of the streamable media streamed to the terminal device of the network; based on the streaming resolution being less than a first target super-resolution, acquiring, by the terminal device from a server of the network, a first target super-resolution neural network model corresponding to the identified streaming resolution and the first target super-resolution; reconstructing, by the terminal device, the instance of the streamable media streamed to the terminal device into an instance of the streamable media at the first target super-resolution using the first target super-resolution neural network model; and playing the reconstructed instance of the streamable media by the terminal device.

The method may further include: generating the first target super-resolution neural network model of the streamable media; and storing the first target super-resolution neural network model on the server, wherein an instance of the streamable media at a first resolution is a training input to the first target super-resolution neural network model, an instance of the streamable media at the first target super-resolution is a learning objective of the target super-resolution neural network model, and the first resolution is lower than the first target super-resolution.

The method may further include: generating a plurality of target super-resolution neural network models of the streamable media, wherein each respective target super-resolution neural network model of the plurality of target super-resolution neural network models corresponds to a first resolution and a respective target super-resolution of a plurality of target super-resolutions; and storing the plurality of target super-resolution neural network models on the server, wherein the plurality of target super-resolutions includes the first target super-resolution, the plurality of target super-resolution neural networks includes the first target super-resolution neural network model, and the first resolution is lower than each respective target super-resolution of the plurality of target super-resolutions, and wherein the acquiring, by the terminal device, the target super-resolution neural network model from the server further comprises: sending, by the terminal device, a super-resolution neural network acquisition request to the server via the network, wherein the super-resolution neural network acquisition request comprises the streaming resolution and a requested target super-resolution from among the plurality of target super-resolutions, and receiving, by the terminal device, the respective target super-resolution neural network model from among the plurality of target super-resolution neural network models corresponding to the first resolution and the requested target super-resolution.

The first target super-resolution neural network model may be encoded with an instance of the streamable media at the streaming resolution.

The method may further include: identifying, by the terminal device, a user type; and identifying, based on the identified user type, the first target super-resolution.

The identifying, based on the identified user type, may further include: based on identifying the user type as an ordinary-level user, identifying the first target super-resolution to be a target resolution currently selected by the user, and based on identifying the user type as an advanced-level user, identifying the first target super-resolution to be a preset advanced playing resolution.

According to an aspect of the disclosure, a super-resolution reconstruction terminal device for adaptive streaming of media includes: at least one memory configured to store at least one instruction; at least one processor configured to execute the at least one instruction to: receive a streamed instance of a streamable media; identify a streaming resolution of the streamed instance of the streamable media; based on the streaming resolution being less than a first target super-resolution, acquire from a server a first target super-resolution neural network model corresponding to the identified streaming resolution and the first target super-resolution; reconstruct the streamed instance of the streamable media into an instance of the streamable media at the first target super-resolution using the first target super-resolution neural network model; and playing the reconstructed instance of the streamable media.

The at least one processor of the super-resolution reconstruction terminal device for adaptive streaming of media may be further configured to execute the at least one instruction to: send to the server a super-resolution neural network acquisition request comprising the streaming resolution and a requested target super-resolution from among a plurality of target super-resolutions, and receive a target super-resolution neural network model from among a plurality of target super-resolution neural network models corresponding to the streaming resolution and the requested target super-resolution.

The at least one processor of the super-resolution reconstruction terminal device for adaptive streaming of media may be further configured to execute the at least one instruction to: identify a user type; and identify, based on the identified user type, the first target super-resolution.

The at least one processor of the super-resolution reconstruction terminal device for adaptive streaming of media may be further configured to execute the at least one instruction to: based on the user type being identified to be an ordinary-level user, identify the first target super-resolution to be a target resolution currently selected by the user, and based on the user type being identified to be an advanced-level user, identify the first target super-resolution to be a preset advanced playing resolution.

According to an aspect of the disclosure, a super-resolution reconstruction system for adaptive streaming of media over a network includes: a server comprising an at least one server memory configured to store at least one server instruction, and an at least one server processor; and a terminal device comprising an at least one terminal device memory configured to store at least one terminal device instruction, and an at least one terminal device processor, wherein the at least one server processor is configured to execute the at least one server instruction to: generate a first target super-resolution neural network model of a streamable media corresponding to a first target super-resolution; and store the first target super-resolution neural network model in the at least one server memory, and wherein the at least one terminal device processor is configured to execute the at least one terminal device instruction to: stream an instance of the streamable media to the terminal device via the network; identify a streaming resolution of the instance of the streamable media streamed to the terminal device; based on the streaming resolution being less than a first target super-resolution, acquiring from the server via the network, the first target super-resolution neural network model; reconstruct the instance of the streamable media streamed to the terminal device into an instance of the streamable media at the first target super-resolution using the first target super-resolution neural network model; and play the reconstructed instance of the streamable media by the terminal device.

The at least one server processor may be further configured to execute the at least one server instruction to generate the first target super-resolution neural network model by providing an instance of the streamable media at a first resolution as a training input to the first target super-resolution neural network model and by providing an instance of the streamable media at the first target super-resolution as a learning objective of the first target super-resolution neural network model, wherein the first resolution is lower than the first target super-resolution.

The first resolution may be the streaming resolution.

The at least one server processor may be further configured to execute the at least one server instruction to: generate a plurality of target super-resolution neural network models of the streamable media, wherein each respective target super-resolution neural network model of the plurality of target super-resolution neural network models corresponds to a first resolution and a respective target super-resolution of a plurality of target super-resolutions; and store the plurality of target super-resolution neural network models in the at least one server memory, wherein the plurality of target super-resolutions includes the first target super-resolution, the plurality of target super-resolution neural networks includes the first target super-resolution neural network model, and the first resolution is lower than each respective target super-resolution of the plurality of target super-resolutions, and wherein the at least one terminal device processor is further configured to execute the at least one terminal device instruction to: send a super-resolution neural network acquisition request to the server via the network, wherein the super-resolution neural network acquisition request comprises the streaming resolution and a requested target super-resolution from among the plurality of target super-resolutions, and receive the respective target super-resolution neural network model from among the plurality of target super-resolution neural network models corresponding to the first resolution and the requested target super-resolution.

The first target super-resolution neural network model may be encoded with an instance of the streamable media at the streaming resolution.

The at least one terminal device processor may be further configured to execute the at least one terminal device instruction to: identify a user type; and identify, based on the identified user type, the first target super-resolution.

The at least one terminal device processor may be further configured to execute the at least one terminal device instruction to: based on identifying the user type as an ordinary-level user, identify the first target super-resolution to be a target resolution currently selected by the user, and based on identifying the user type as an advanced-level user, identify the first target super-resolution to be a preset advanced playing resolution.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1A is a flow diagram of a super-resolution reconstruction method for an adaptive streaming media according to an embodiment of the present disclosure;

FIG. 1B is a flow diagram of a super-resolution reconstruction method for an adaptive streaming media according to an embodiment of the present disclosure;

Figure 2A:
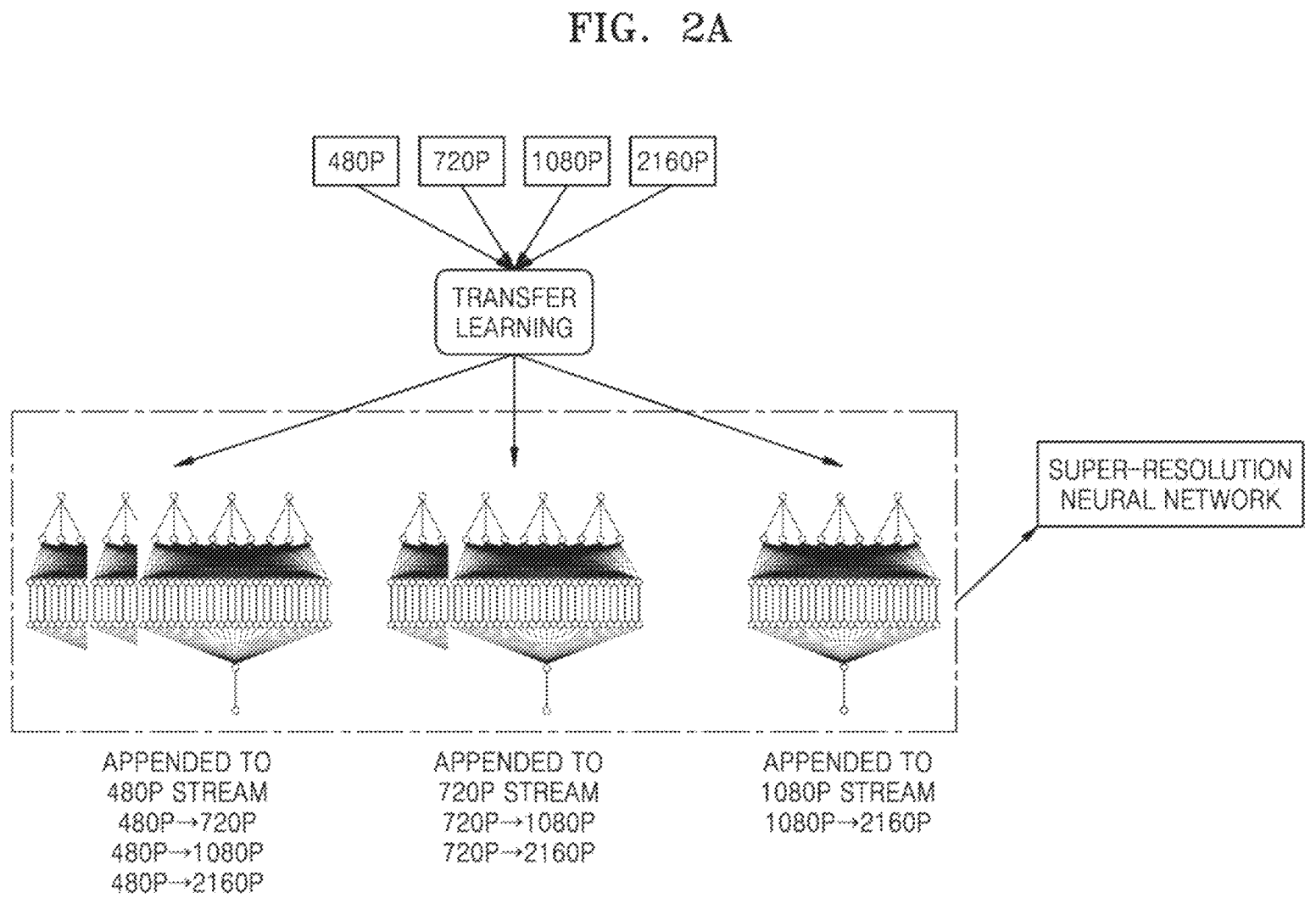

FIG. 2A is a generation diagram of a super-resolution neural network according to an embodiment of the present disclosure;

DETAILED DESCRIPTION

Figure 2B:
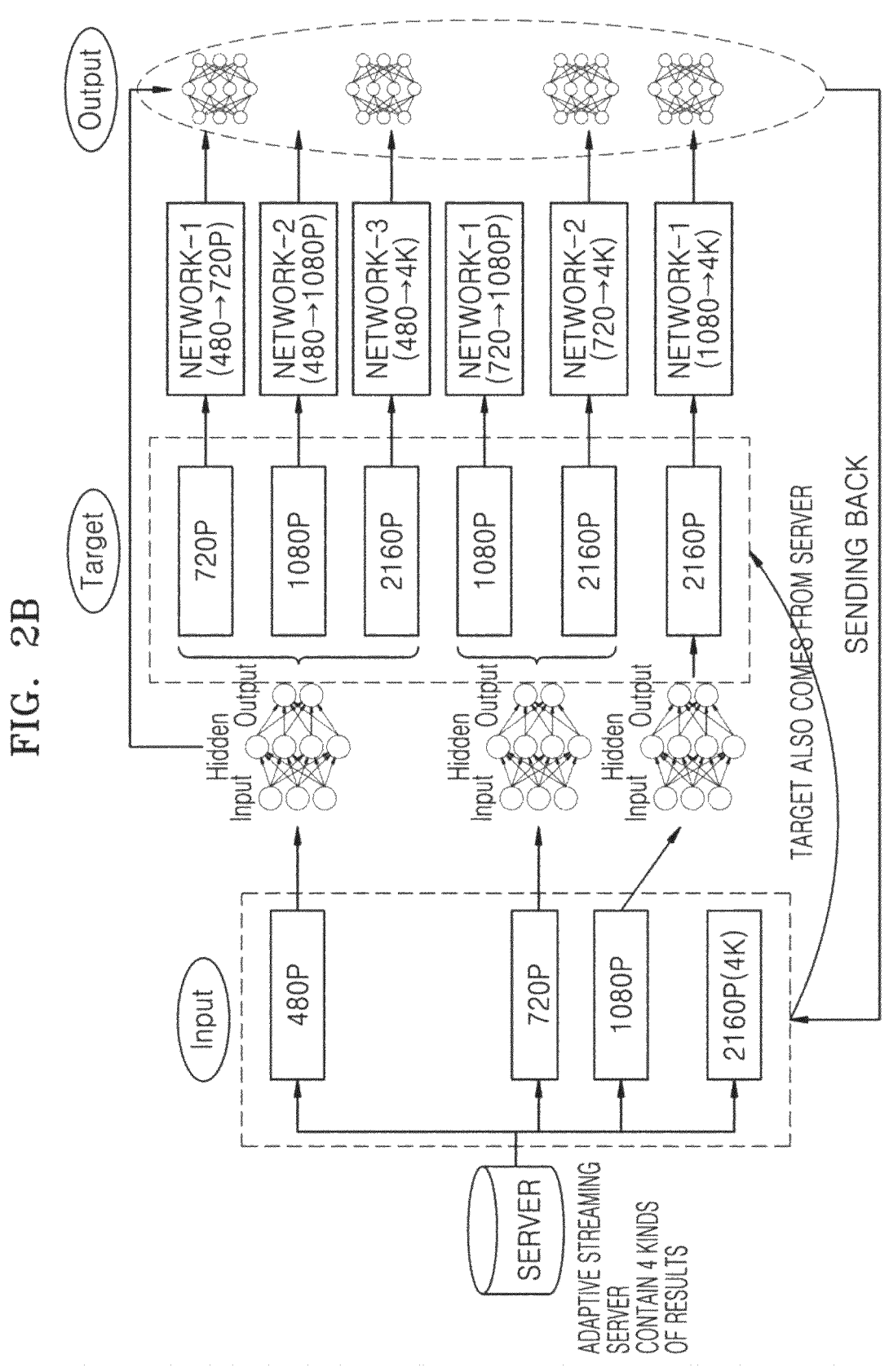
FIG. 2B is a generation diagram of a super-resolution neural network according to an embodiment of the present disclosure.

The present disclosure will be further described in detail below with reference to the accompanying drawings and specific examples.

FIG. 1A is a flow diagram of a super-resolution reconstruction method for an adaptive streaming media according to an embodiment of the present disclosure. As shown in FIG. 1A, this example mainly includes the following steps.

In step 101, during a playing process of a streaming media, if a first resolution of a video stream downloaded by a terminal device does not reach a target super-resolution, the terminal device acquires a corresponding super-resolution neural network from a server according to the first resolution and the target super-resolution.

The super-resolution neural network is obtained by performing model training in advance by taking a video stream of the first resolution of the streaming media as an input and taking a video stream of the target super-resolution of the streaming media as a learning objective. The target super-resolution is greater than the first resolution.

The target super-resolution is used to characterize video playing requirements of a user. Here, when a first resolution of a video stream downloaded by a terminal device does not reach a target super-resolution in a playing process of a streaming media (for example, when the resolution of the video stream downloaded by the terminal device is reduced due to the influence of network conditions, or the terminal device selects a higher-resolution video stream, and a corresponding higher-resolution video stream cannot be downloaded due to the restriction of the network conditions or a lower user priority, etc.), the terminal device will acquire a corresponding super-resolution neural network from a server according to the currently configured target super-resolution in the terminal device and the resolution of the currently downloaded video stream, whereby the downloaded video stream is reconstructed into a video stream at the target super-resolution by means of the super-resolution neural network. The super-resolution neural network acquired by the terminal device from the server is generated by training in advance through the server based on video data of the currently played streaming media, e.g., obtained by performing model training by taking a video stream at the current resolution (e.g., first resolution) of the currently played streaming media as an input and taking a video stream at the target super-resolution of the streaming media as a learning objective. Thus, the reconstructed video stream can be closer to an original video at the target super-resolution, so that the accuracy of super-resolution reconstruction can be improved, and the problem that the resolution of the downloaded video stream cannot meet the requirements of a user is effectively solved. Then, the video quality during the playing of the self-adaptive streaming media can be improved, and the playing resolution requirements of the user can be met to a greater extent. Accordingly, the influence of network conditions on the video quality can be reduced. The video quality can be ensured while the smoothness of video playing is also ensured.

In one embodiment, in order to improve the efficiency of model training, a server side may perform the above model training based on a preset basic neural network by means of the following method:

Transfer learning is performed on a preset basic neural network by taking a video stream at the first resolution of the streaming media as an input and taking a video stream at the target super-resolution of the streaming media as a learning objective.

Specifically, the basic neural network may be implemented using existing super-resolution neural network models, such as, but not limited to, an SRCNN.

In addition, in practical applications, the super-resolution neural network is generated based on, but not limited to, the existing models, and model training may also be directly performed again without relying on a basic model.

Here, model training is performed by means of media data of the streaming media, e.g. model training is performed by taking a video stream at the first resolution of the streaming media as an input and taking a video stream at the target super-resolution of the streaming media as a learning objective, so that a super-resolution neural network obtained by training (specifically including a neural network structure and parameters) can accurately reconstruct the video stream at the first resolution of the media into a video stream at the target super-resolution.

In practical applications, in order to improve the generation efficiency of the super-resolution neural network, a dedicated machine learning server may be used to generate the above super-resolution neural network. Specifically, a content server may send the video stream content of a streaming media to the machine learning server in advance, and the machine learning server is triggered to generate the super-resolution neural network.

In one embodiment, after the super-resolution neural network is generated, in order to facilitate subsequent query and acquisition, a super-resolution neural network model may be appended to a corresponding video stream, e,g, the super-resolution neural network is stored in the server and encoded with the video stream at the first resolution of the streaming media. For example, by taking a 1080p stream as a learning input and a 2160p stream as a learning objective, a super-resolution neural network is generated: 1080→2160p. The super-resolution neural network will be stored encoded with the 1080p stream.

In one embodiment, in step 101, the terminal device may specifically acquire a corresponding super-resolution neural network from a server by using the following method:

The terminal device sends a super-resolution neural network acquisition request to the server. The super-resolution neural network acquisition request carries the first resolution and the target super-resolution, so as to trigger the server to acquire the super-resolution neural network matching a combination of the first resolution and the target super-resolution from a super-resolution neural network set generated in advance for the streaming media.

Here, when the terminal device sends a super-resolution neural network acquisition request to the server, an input resolution (e.g. a first resolution) and a target resolution (e.g. a currently configured target super-resolution in a terminal) for super-resolution reconstruction need to be carried, whereby the server side may accurately find a matching super-resolution neural network by indexing the information, and provide the super-resolution neural network to the terminal device.

In one embodiment, in order to better meet the super-resolution reconstruction requirements of different types of users, the target super-resolution is determined by the terminal device according to a preset super-resolution setting principle based on the type of users currently playing the streaming media.

The super-resolution setting principle may be set by a user or a content provider according to actual application requirements. For example, in one embodiment, in order to provide a higher-quality video playing service for an advanced-level user, the super-resolution setting principle may include:

If the user is an ordinary-level user, the target super-resolution is a target playing resolution currently selected by the user, and if the user is an advanced-level user, the target super-resolution is a preset advanced playing resolution. Generally, the advanced playing resolution will be higher than a target playing resolution range selectable for the ordinary-level user.

In step 102, the terminal device reconstructs the downloaded video stream into a video stream at the target super-resolution by using the super-resolution neural network, and plays the streaming media based on the reconstructed video stream.

Here, the reconstructed video stream at the target super-resolution is used to play the streaming media after the resolution of the streaming media is reduced, and as described above, the acquired super-resolution neural network can ensure that the reconstructed video stream is closer to an original video stream at the target super-resolution. Therefore, the influence of network bandwidth on the playing resolution of the streaming media can be reduced, so that the playing quality of video can meet the playing requirements of users and will not be reduced as the resolution of the downloaded video stream is reduced, thereby improving the video quality during the playing of an adaptive streaming media.

As can be seen from the above technical solution, the video quality during the playing of the adaptive streaming media can be effectively improved by means of the above method example. A specific implementation of the above example is described in further detail below in conjunction with FIGS. 2-4 with a playing example of a specific streaming media.

Adaptive stream (HLS) playing provided by a certain multimedia playing platform is taken as an example:

In step 1, a content server sends resolution streams of a movie to a machine learning server in advance.

In step 2, the machine learning server generates super-resolution neural networks corresponding to different high resolutions respectively for each resolution except a maximum resolution based on the received resolution streams, and sends the super-resolution neural networks to the content server, and the content server appends these super-resolution neural networks to video streams at the corresponding resolutions.

FIG. 1B is a flow diagram of a super-resolution reconstruction method for an adaptive streaming media according to an embodiment of the present disclosure.

In operation S101, a super-resolution reconstruction system may stream an instance of streamable media to a terminal device via a network.

In an embodiment, a super-resolution reconstruction terminal device may stream an instance of streamable media received from a server.

In an embodiment, a super-resolution reconstruction terminal device may stream an instance of streamable media received from a content streaming server.

In operation S102, a super-resolution reconstruction system may identify a streaming resolution of the instance of the streamable media.

In an embodiment, a super-resolution reconstruction terminal device may identify a streaming resolution of the instance of the streamable media received from a server.

In an embodiment, a super-resolution reconstruction terminal device may identify a streaming resolution of the instance of the streamable media received from a content streaming server.

In operation S103, based on the streaming resolution being less than a first target super-resolution, the terminal device may acquire from a server of the network, a first target super-resolution neural network model corresponding to the identified streaming resolution and the first target super-resolution.

In an embodiment, the first target super-resolution may be stored in advance by system or user.

In an embodiment, the first target super-resolution may be obtained by receiving a user input.

A first target super-resolution neural network model may be a model taking a media at a first target super-resolution as an input and outputting a media at the first target super-resolution.

In operation S104, the terminal device may reconstruct the instance of the streamable media streamed to into an instance of the streamable media at the first target super-resolution using the first target super-resolution neural network model.

In operation S105, the terminal device may play the reconstructed instance of the streamable media.

As shown in FIG. 2A, it is assumed that there are four resolutions: 480p, 720p, 1080p, and 2160p. The machine learning server performs transfer learning by taking a 480p stream as an input, respectively taking the other three high-resolution streams as a learning objective, and taking a basic network model (SRCNN) as a basic model, and will generate three corresponding super-resolution neural networks: 480→720p, 480→1080p, and 480→2160p.

Also, by taking a 720p stream as a learning input and taking 1080p and 2160p as a learning objective, two super-resolution neural networks will be generated: 720→1080p and 720→2160p. By taking 1080p as a learning input and taking 2160p as a learning objective, one super-resolution neural network will be generated: 1080→2160p.

The generated super-resolution neural network is sent back to the content server and appended to the video stream.

In step 3, when network conditions of a terminal device deteriorate and a downloading resolution of the video stream is reduced in the playing process of a streaming media, the terminal device requests to download a corresponding super-resolution neural network.

Figure 3:
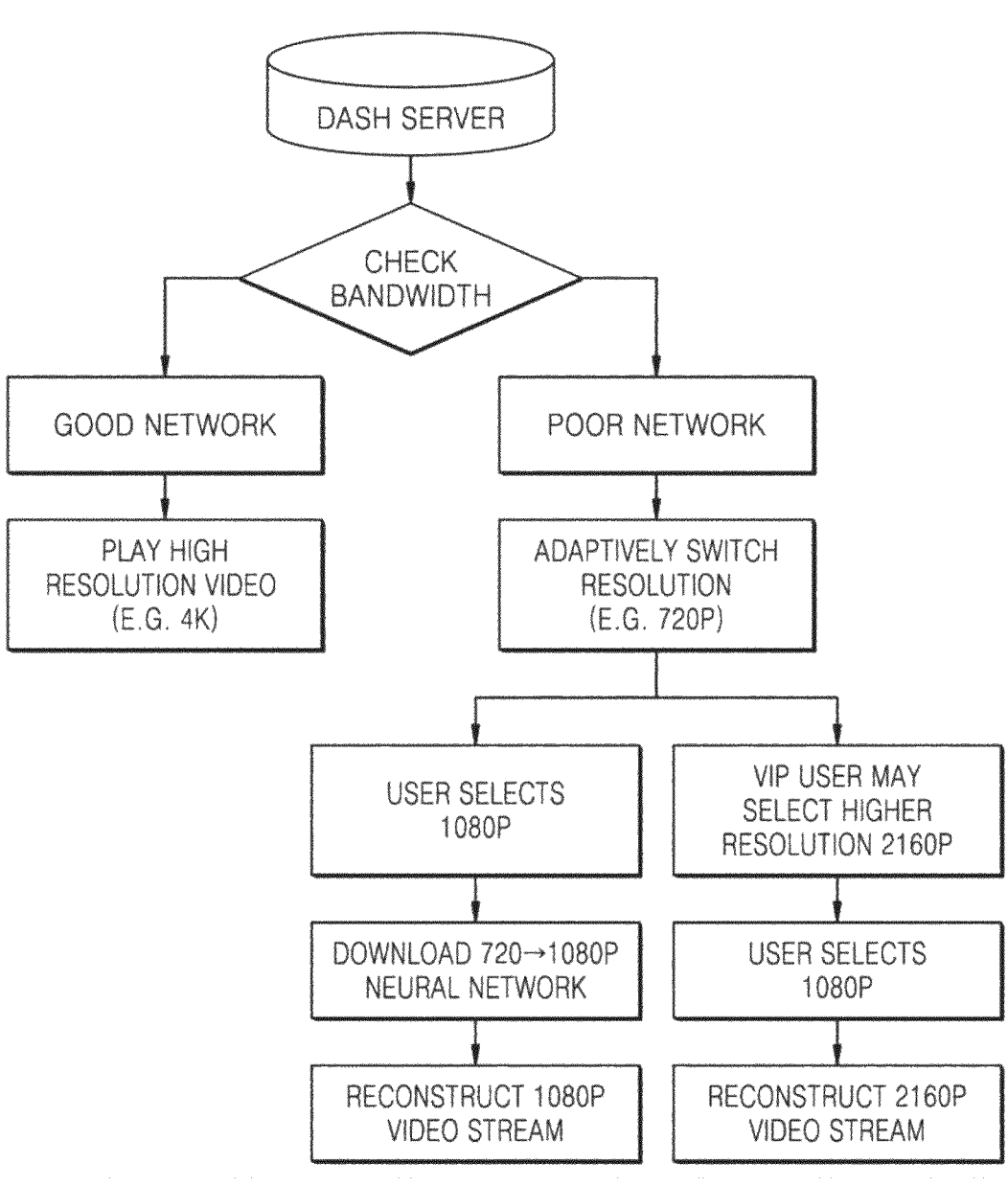
FIG. 3 is a sample flow chart of super-resolution reconstruction according to an embodiment of the present disclosure.

For example, as shown in FIG. 3, in the playing process of the streaming media, the server or the terminal device may check the network conditions. When the network conditions are good, the terminal device may play a high-resolution video (such as 2160p or 4k). When the network conditions are poor, the resolution of the downloaded video stream needs to be reduced. In the embodiment of FIG. 2A, it is assumed that the currently downloaded video stream of the terminal device is reduced to a 720p stream. When the user is an ordinary-level user, the target super-resolution selected by the user is 1080p, and the terminal device will request to download a super-resolution neural network of 720p→1080p at this moment. When the user is an advanced-level (e.g., "VIP") user, the corresponding target super-resolution is 2160p, and the terminal device will request to download a super-resolution neural network of 720p→2160p at this moment.

In step 4, based on a neural network structure and parameters corresponding to the obtained super-resolution neural network, the terminal device performs reconstruction processing on the currently downloaded video stream to obtain a corresponding high-resolution stream, and performs video playing based on the reconstructed high-resolution stream.

FIG. 2B is a generation diagram of a super-resolution neural network according to an embodiment of the present disclosure.

Adaptive streaming server may send all kinds of resolution streams to a machine learning server.

In an embodiment, the adaptive streaming server may contain a media at 4 kinds of resolution (480p, 720p, 1080p, 2160p).

The adaptive streaming server may transfer the media at 4 kinds of resolution (480p, 720p, 1080p, 2160p) to a machine learning server as a input.

The machine learning server makes a target resolution of each media.

The adaptive streaming server already has a media at a target resolution. And the machine learning server also received a media at a target resolution. Therefore, the machine learning server can train at least one of neural network models using both of a source media at a lower resolution and a target media at a higher resolution received from the adaptive streaming server.

After training, the machine learning server may output at least one of updated neural network models.

The machine learning server may send the at least one of updated neural network models to the adaptive streaming server.

Figure 4:
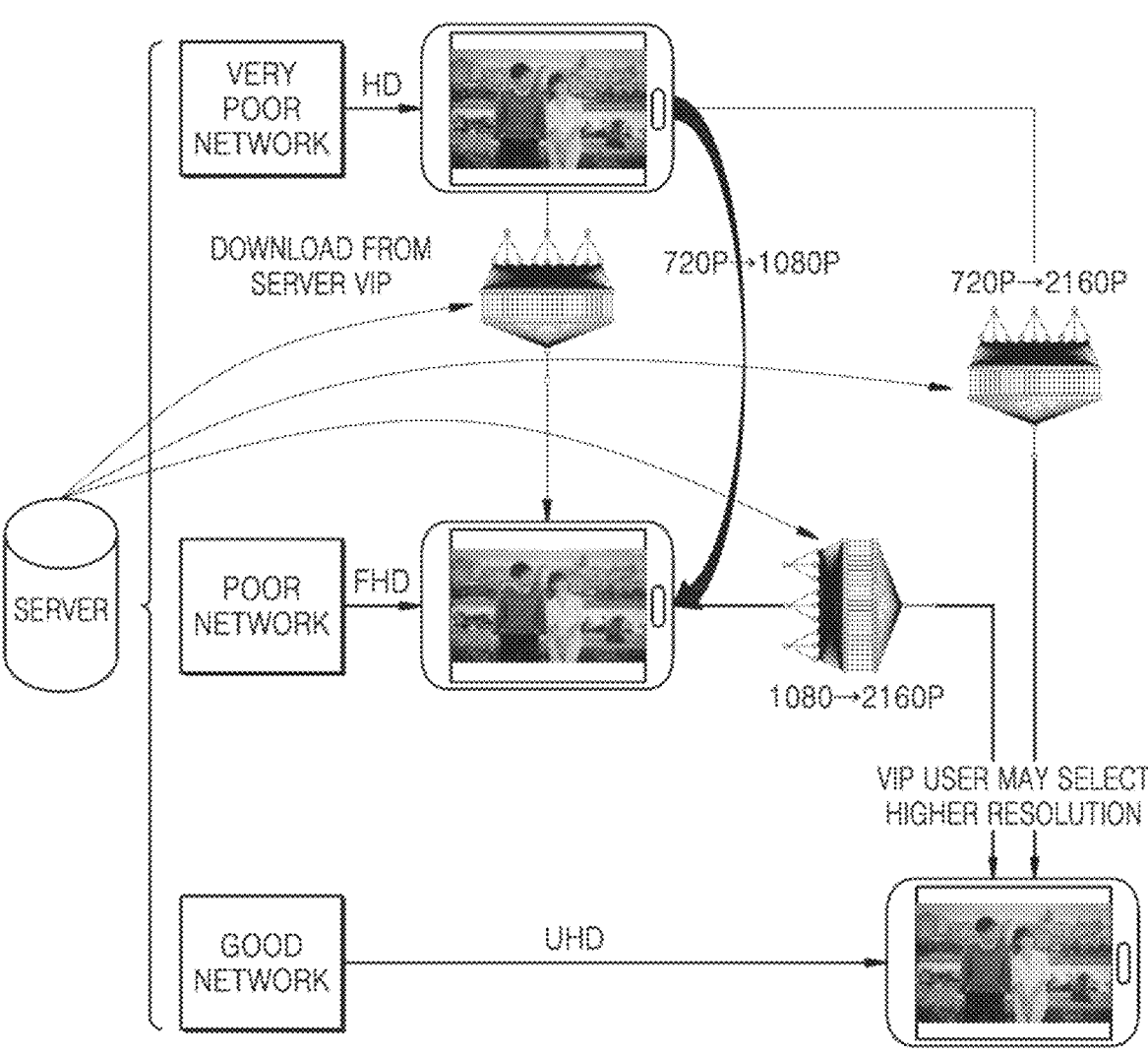
FIG. 4 is a sample diagram of a super-resolution reconstruction effect according to an embodiment of the present disclosure.

FIG. 4 shows a sample diagram of a super-resolution reconstruction effect under different network states. As shown in FIG. 4, when the network is poor, the super-resolution neural network 1080→2160p is used for reconstruction processing, and when the network is very poor, the super-resolution neural network 720p→2160p is used for reconstruction processing. As can be seen from the figure, a playing effect of video with a better quality can be obtained based on the reconstructed video stream.

Figure 5:
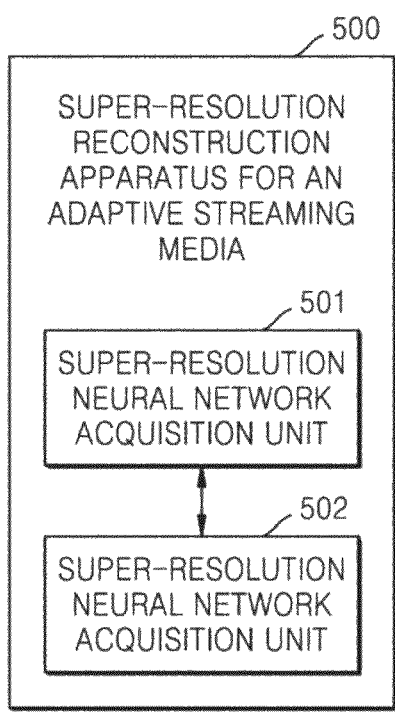
FIG. 5 is a structural diagram of a super-resolution reconstruction apparatus for an adaptive streaming media according to an embodiment of the present disclosure.

Corresponding to the above example, an embodiment of the present disclosure also provides a super-resolution reconstruction apparatus for an adaptive streaming media 500, which is provided in a terminal device. As shown in FIG. 5, the apparatus 500 includes:

a super-resolution neural network acquisition unit 501, configured to enable, when a first resolution of a video stream downloaded by a terminal device does not reach a target super-resolution in a playing process of a streaming media, the terminal device to acquire a corresponding super-resolution neural network from a server according to the first resolution and the target super-resolution, wherein the super-resolution neural network is obtained by performing model training in advance by taking a video stream at the first resolution of the streaming media as an input and taking a video stream at the target super-resolution of the streaming media as a learning objective, and the target super-resolution is greater than the first resolution; and a reconstruction and playing unit 502, configured to reconstruct the downloaded video stream into a video stream at the target super-resolution by using the super-resolution neural network, and play the streaming media based on the reconstructed video stream.

Figure 6:
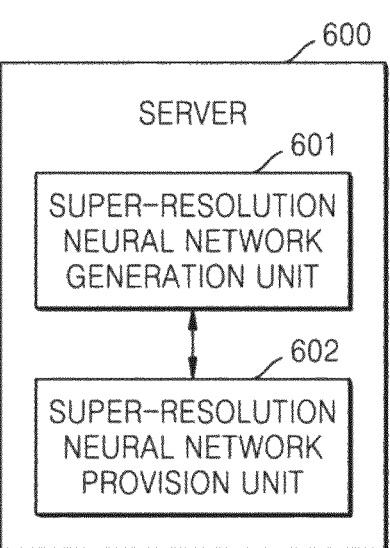
FIG. 6 is a structural diagram of a server according to an embodiment of the present disclosure.

Corresponding to the above example, an embodiment of the present application also provides a server. As shown in FIG. 6, the server 600 includes:

a super-resolution neural network generation unit 601, configured to perform, for each first resolution corresponding to a video stream of each streaming media St needing to be provided to a terminal device, model training in advance by taking a video stream at the first resolution of the streaming media St as an input and taking each second resolution corresponding to the first resolution as a learning objective, so as to obtain a super-resolution neural network for reconstructing the video stream at the first resolution of the streaming media St into a video stream at the second resolution, wherein the first resolution is less than a maximum resolution corresponding to the video stream of the streaming media St, the second resolution is a resolution greater than the first resolution and less than or equal to a preset maximum reconstruction resolution within a resolution range of the video stream of the streaming media St, and the maximum reconstruction resolution is greater than the first resolution; and a super-resolution neural network provision unit 602, configured to send the corresponding super-resolution neural network to the terminal device according to a request of the terminal device, whereby the terminal device reconstructs the currently received video stream into a video stream at a current target super-resolution based on the super-resolution neural network in a playing process of a corresponding streaming media.

An appropriate value of the above maximum reconstruction resolution may be specifically set by a person skilled in the art according to actual requirements. For example, in order to meet the high-resolution playing requirements of various users, the maximum reconstruction resolution may be, but is not limited thereto, a maximum value in the video stream resolution range corresponding to the streaming media.

It should be noted that the above method and apparatus examples are based on the same concept. Since the principles of the method and apparatus for solving the problems are similar, the implementations of the apparatus and the method may be referred to each other, and the repetition will be omitted.

Corresponding to the above method example, an example of the present application also provides a super-resolution reconstruction device for an adaptive streaming media, including a processor and a memory. The memory stores an application executable by the processor for causing the processor to perform the super-resolution reconstruction method for an adaptive streaming media as described above. Specifically, a system or apparatus with a storage medium may be provided. A software program code that realizes the functions of any one embodiment in the above example is stored on the storage medium, and a computer (or a CPU or an MPU) of the system or apparatus is caused to read out and execute the program code stored in the storage medium. In addition, some or all of actual operations may be performed by means of an operating system or the like operating on the computer through instructions based on the program code.

The program code read out from the storage medium may also be written into a memory provided in an expansion board inserted into the computer or into a memory provided in an expansion unit connected to the computer. Then, an instruction based on the program code causes a CPU or the like installed on the expansion board or the expansion unit to perform some or all of the actual operations, thereby realizing the functions of any one of the above super-resolution reconstruction method embodiments for an adaptive streaming media.

The memory may be specifically implemented as various storage media such as an electrically erasable programmable read-only memory (EEPROM), a flash memory, a programmable program read-only memory (PROM), etc. The processor may be implemented to include one or more central processing units or one or more field programmable gate arrays. The field programmable gate arrays are integrated with one or more central processing unit cores. Specifically, the central processor or central processor core may be implemented as a CPU or an MCU.

An example of the present application implements a computer program product, including computer programs/instructions which, when executed by a processor, implement the steps of the super-resolution reconstruction method for an adaptive streaming media as described above.

It should be noted that not all the steps and modules in the above flow charts and structural diagrams are necessary, and some steps or modules may be omitted according to actual requirements. The order of execution of the various steps is not fixed and may be adjusted as required. The division of the various modules is merely to facilitate the description of the functional division adopted. In actual implementation, one module may be implemented by a plurality of modules. The functions of the plurality of modules may also be realized by the same module. These modules may be located in the same device or in different devices.

Hardware modules in the various embodiments may be implemented mechanically or electronically. For example, a hardware module may include a specially designed permanent circuit or logic device (e.g. a dedicated processor such as an FPGA or an ASIC) to perform a particular operation. The hardware module may also include a programmable logic device or circuit (e.g. including a general purpose processor or other programmable processors) temporarily configured by software to perform a particular operation. The implementation of the hardware modules mechanically, or using a dedicated permanent circuit, or using a temporarily configured circuit (e.g. configured by software) may be determined based on cost and time considerations.

As used herein, "schematic" means "serving as an instance, example, or illustration". Any illustration and embodiment described herein as "schematic" should not be construed as a more preferred or advantageous technical solution. For simplicity of the drawings, only those portions related to the present disclosure are schematically depicted in the figures and are not representative of an actual structure of a product. In addition, for simplicity and ease of understanding, only one of components having the same structure or function is schematically drawn or marked in some figures. As used herein, "one" does not mean to limit the number of portions related to the present disclosure to "only one", and "one" does not mean to exclude the case that the number of portions related to the present disclosure is "more than one". As used herein, "upper", "lower", "front", "back", "left", "right", "inner", "outer", and the like are used merely to indicate relative positional relationships between related portions, and do not limit absolute positions of these related portions.

Figure 7:
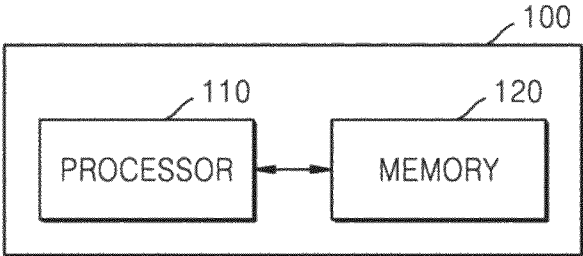
FIG. 7 is a structural diagram of a super-resolution reconstruction terminal device for an adaptive streaming media according to an embodiment of the present disclosure.

FIG. 7 is a structural diagram of a super-resolution reconstruction terminal device for an adaptive streaming media according to an embodiment of the present disclosure.

Referring to FIG. 7, the super-resolution reconstruction terminal device 100 may include a processor 110 and a memory 120.

The memory 120 may store a program for processing and controlling the processor 110. The memory 120 may store data that is input to the super-resolution reconstruction terminal device 100 or output by the super-resolution reconstruction terminal device 100.

The memory 120 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

The memory 120 may store one or more instructions executable by the processor 110.

According to an embodiment of the disclosure, the memory 120 may store various types of information than are received through an input/output interface (not shown).

According to an embodiment of the disclosure, the memory 120 may store an instruction for streaming an instance of streamable media received from a server, identify a streaming resolution of the instance of the streamable media, based on the streaming resolution being less than a first target super-resolution, acquiring from a server of the network, a first target super-resolution neural network model corresponding to the identified streaming resolution and the first target super-resolution, reconstructing the instance of the streamable media streamed to into an instance of the streamable media at the first target super-resolution using the first target super-resolution neural network model and playing the reconstructed instance of the streamable media.

When there is an input of a user or stored preset conditions are satisfied, the processor 110 may execute an operating system (OS) and various applications that are stored in the memory 120.

The processor 110 may include a RAM that stores a signal or data received from the outside of the super-resolution reconstruction terminal device 100 or is used as a storage area for various operations performed by the super-resolution reconstruction terminal device 100, and a ROM that stores a control program for controlling the super-resolution reconstruction terminal device 100.

The processor 110 may include a single core, a dual core, a triple core, a quad core, or a multiple core thereof. The processor 110 may include a plurality of processors. For example, the processor 110 may be implemented by using a main processor and a sub-processor operating in a sleep mode.

The processor 110 may include at least one of a central processing unit (CPU), a graphics processing unit (GPU), or a video processing unit (VPU). Alternatively, in some cases, the processor 110 may be implemented in the form of a system on chip (SOC) that integrates at least one of a CPU, a GPU, or a VPU.

The processor 110 may control the components of the super-resolution reconstruction terminal device 100 by executing the one or more programs stored in the memory 120.

According to an embodiment of the disclosure, the processor 110 may stream an instance of streamable media to a terminal device via a network.

According to an embodiment of the disclosure, the processor 110 may identify a streaming resolution of the instance of the streamable media.

According to an embodiment of the disclosure, based on the streaming resolution being less than a first target super-resolution, the processor 110 may acquire from a server of the network, a first target super-resolution neural network model corresponding to the identified streaming resolution and the first target super-resolution.

According to an embodiment of the disclosure, the processor 110 may reconstruct the instance of the streamable media streamed to into an instance of the streamable media at the first target super-resolution using the first target super-resolution neural network model.

According to an embodiment of the disclosure, the processor 110 may play the reconstructed instance of the streamable media.

Figure 8:
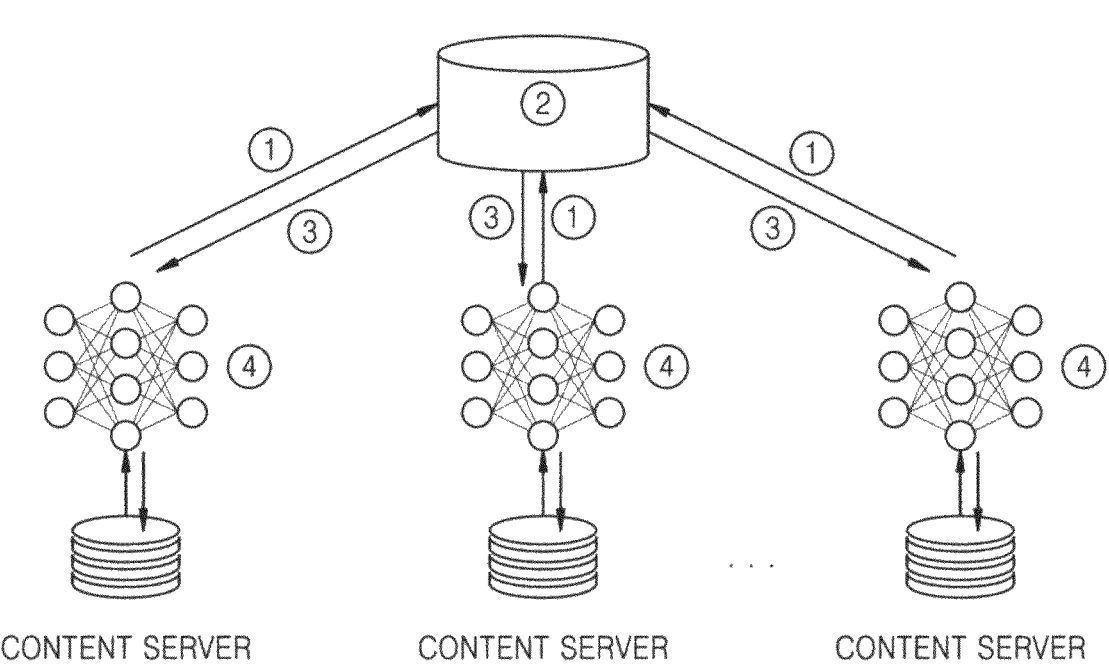
FIG. 8 is a structural diagram of a super-resolution reconstruction system for an adaptive streaming media according to an embodiment of the present disclosure.

FIG. 8 is a structural diagram of a super-resolution reconstruction system for an adaptive streaming media according to an embodiment of the present disclosure.

In an embodiment, the adaptive streaming server can be the content server.

At least one of the content server may send all kinds of resolution streams to a machine learning server (①).

The machine learning server will do transfer learning based on a common Module (such as SRCNN) (②).

The transfer learning uses a low-resolution stream as input, and high-resolution streams as target, to perform study procedure.

After study procedure is finished, the machine learning server will send the updated neural network models back to the adaptive streaming server, attached in the source streams (③).

This updated modules almost can accurately reconstruct the High-Resolution video (④).

Figure 9:
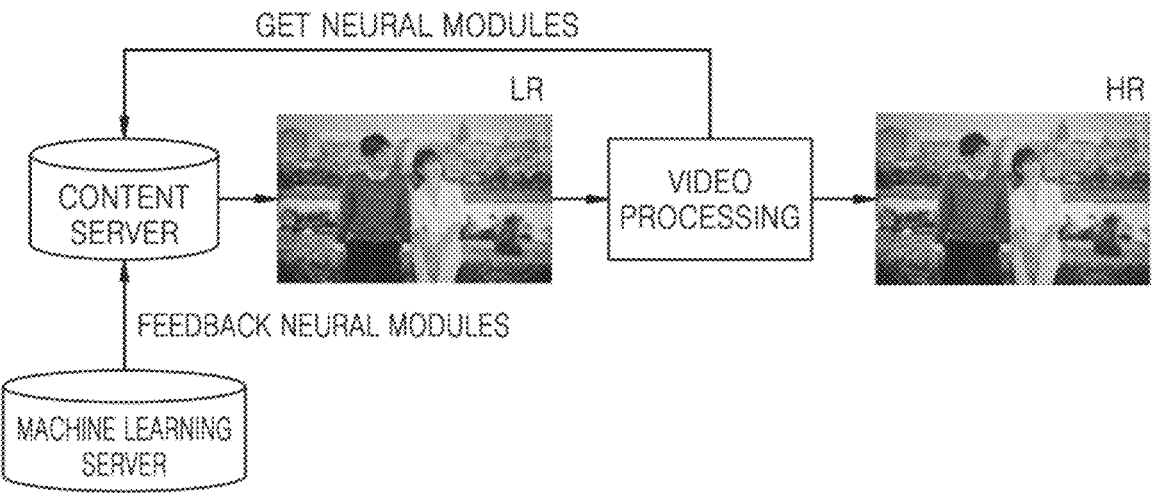
FIG. 9 is a structural diagram of a super-resolution reconstruction system for an adaptive streaming media according to an embodiment of the present disclosure.

FIG. 9 is a structural diagram of a super-resolution reconstruction system for an adaptive streaming media according to an embodiment of the present disclosure.

The content server may send all kinds of resolution streams to a machine learning server.

The machine learning server will train at least one of neural modules with a low-resolution stream as input, and high-resolution streams as target.

After study is finished, the machine learning server will send the updated neural modules back to the content server.

This content server sends a low-resolution stream to a terminal device of a user.

According to the user's selected resolution, the terminal device performs video processing by downloading the corresponding neural network module. The updated modules almost can accurately reconstruct the high-resolution video.

The above description includes examples of the present disclosure and is not intended to limit the scope of the present disclosure. Any modifications, equivalent replacements, improvements, etc. that come within the spirit and principles of the present disclosure are intended to be within the scope of the present disclosure.

What is claimed is:

1. A super-resolution reconstruction method for an adaptive streaming of media over a network, the super-resolution reconstruction method comprising:

streaming an instance of a streamable media to a terminal device via the network;

identifying a streaming resolution of the instance of the streamable media;

based on the streaming resolution being less than a first target super-resolution, acquiring, by the terminal device from a server of the network, a first target super-resolution neural network model corresponding to the streaming resolution and the first target super-resolution;

reconstructing the instance of the streamable media streamed to the terminal device into an instance of the streamable media at the first target super-resolution using the first target super-resolution neural network model;

playing the reconstructed instance of the streamable media by the terminal device, wherein the first target super-resolution neural network model is obtained by performing model training in advance by taking a media at the streaming resolution received from the server as an input and taking a media at the first target super-resolution received from the server as a learning objective, wherein the super-resolution reconstruction method further comprises:

generating a plurality of target super-resolution neural network models of the streamable media; and storing the plurality of target super-resolution neural network models on the server, and wherein the acquiring, by the terminal device, the first target super-resolution neural network model from the server further comprises:

sending, by the terminal device, a super-resolution neural network acquisition request to the server via the network, wherein the super-resolution neural network acquisition request comprises the streaming resolution and a requested target super-resolution from among a plurality of target super-resolutions; and receiving, by the terminal device, the respective target super-resolution neural network model from among the plurality of target super-resolution neural network models corresponding to a first resolution and the requested target super-resolution.

2. The super-resolution reconstruction method of claim 1, further comprising:

generating the first target super-resolution neural network model of the streamable media; and storing the first target super-resolution neural network model on the server.

3. The method of claim 1, wherein each respective target super-resolution neural network model of the plurality of target super-resolution neural network models corresponds to the first resolution and a respective target super-resolution of the plurality of target super-resolutions, and wherein the plurality of target super-resolutions includes the first target super-resolution, the plurality of target super-resolution neural network models includes the first target super-resolution neural network model, and the first resolution is lower than each respective target super-resolution of the plurality of target super-resolutions.

4. The super-resolution reconstruction method of claim 1, wherein the first target super-resolution neural network model is encoded with an instance of the streamable media at the streaming resolution.

5. The super-resolution reconstruction method of claim 1, further comprising:

identifying, by the terminal device, a user type; and identifying, based on the identified user type, the first target super-resolution.

6. The super-resolution reconstruction method of claim 5, wherein the identifying, based on the identified user type, further comprises:

based on identifying the user type as an ordinary-level user, identifying the first target super-resolution to be a target resolution currently selected by a user, and based on identifying the user type as an advanced-level user, identifying the first target super-resolution to be a preset advanced playing resolution.

7. A super-resolution reconstruction terminal device for adaptive streaming of media comprising:

at least one memory configured to store at least one instruction; and at least one processor configured to execute the at least one instruction, wherein the at least one instruction, when executed by the at least one processor, causes the super-resolution reconstruction terminal device to:

receive a streamed instance of a streamable media;

identify a streaming resolution of the streamed instance of the streamable media;

based on the streaming resolution being less than a first target super-resolution, acquire from a server a first target super-resolution neural network model corresponding to the streaming resolution and the first target super-resolution;

reconstruct the streamed instance of the streamable media into an instance of the streamable media at the first target super-resolution using the first target super-resolution neural network model; and play the reconstructed instance of the streamable media, wherein the first target super-resolution neural network model is obtained by performing model training in advance by taking a media at the streaming resolution received from the server as an input and taking a media at the first target super-resolution received from the server as a learning objective, and wherein the at least one instruction, when executed by the at least one processor, further causes the super-resolution reconstruction terminal device to:

send to the server a super-resolution neural network acquisition request comprising the streaming resolution and a requested target super-resolution from among a plurality of target super-resolutions, and receive a target super-resolution neural network model, from among a plurality of target super-resolution neural network models, corresponding to the streaming resolution and the requested target super-resolution.

8. The super-resolution reconstruction terminal device of claim 7, wherein each respective target super-resolution neural network model of the plurality of target super-resolution neural network models corresponds to a first resolution and a respective target super-resolution of the plurality of target super-resolutions, and wherein the plurality of target super-resolutions includes the first target super-resolution, the plurality of target super-resolution neural network models includes the first target super-resolution neural network model, and the first resolution is lower than each respective target super-resolution of the plurality of target super-resolutions.

9. The super-resolution reconstruction terminal device of claim 7, wherein the at least one instruction, when executed by the at least one processor, further causes the super-resolution reconstruction terminal device to:

identify a user type; and identify, based on the identified user type, the first target super-resolution.

10. The super-resolution reconstruction terminal device of claim 9, wherein the at least one instruction, when executed by the at least one processor, further causes the super-resolution reconstruction terminal device to:

based on the user type being identified to be an ordinary-level user, identify the first target super-resolution to be a target resolution currently selected by a user, and based on the user type being identified to be an advanced-level user, identify the first target super-resolution to be a preset advanced playing resolution.

11. A super-resolution reconstruction system for adaptive streaming of media over a network, the super-resolution reconstruction system comprising:

a server comprising at least one server memory configured to store at least one server instruction, and at least one server processor configured to execute the at least one server instruction; and a terminal device comprising at least one terminal device memory configured to store at least one terminal device instruction, and at least one terminal device processor configured to execute the at least one terminal device instruction, wherein the at least one server instruction, when executed by the at least one server processor, causes the server to:

generate a first target super-resolution neural network model of a streamable media corresponding to a first target super-resolution by providing an instance of the streamable media at a first resolution as a training input to the first target super-resolution neural network model and by providing an instance of the streamable media at the first target super-resolution as a learning objective of the first target super-resolution neural network model wherein the first resolution is lower than the first target super-resolution; and store the first target super-resolution neural network model in the at least one server memory, wherein the at least one terminal device instruction, when executed by the at least one terminal device processor, causes the terminal device to:

stream an instance of the streamable media to the terminal device via the network;

identify a streaming resolution of the instance of the streamable media streamed to the terminal device;

based on the streaming resolution being less than the first target super-resolution, acquire from the server via the network, the first target super-resolution neural network model;

reconstruct the instance of the streamable media streamed to the terminal device into an instance of the streamable media at the first target super-resolution using the first target super-resolution neural network model; and play the reconstructed instance of the streamable media by the terminal device, wherein the at least one server instruction, when executed by the at least one server processor, further causes the server to:

generate a plurality of target super-resolution neural network models of the streamable media; and store the plurality of target super-resolution neural network models in the at least one server memory, and wherein the at least one terminal device instruction, when executed by the at least one terminal device processor, further causes the terminal device to:

send a super-resolution neural network acquisition request to the server via the network, wherein the super-resolution neural network acquisition request comprises the streaming resolution and a requested target super-resolution from among a plurality of target super-resolutions, and receive the respective target super-resolution neural network model from among the plurality of target super-resolution neural network models corresponding to the first resolution and the requested target super-resolution.

12. The super-resolution reconstruction system of claim 11, wherein the first resolution is the streaming resolution.

13. The super-resolution reconstruction system of claim 11, wherein each respective target super-resolution neural network model of the plurality of target super-resolution neural network models corresponds to the first resolution and a respective target super-resolution of the plurality of target super-resolutions, and wherein the plurality of target super-resolutions includes the first target super-resolution, the plurality of target super-resolution neural network models includes the first target super-resolution neural network model, and the first resolution is lower than each respective target super-resolution of the plurality of target super-resolutions.

14. The super-resolution reconstruction system of claim 11, wherein the first target super-resolution neural network model is encoded with an instance of the streamable media at the streaming resolution.

15. The super-resolution reconstruction system of claim 11, wherein the at least one terminal device instruction, when executed by the at least one terminal device processor, causes the terminal device to:

identify a user type; and identify, based on the identified user type, the first target super-resolution.

16. The super-resolution reconstruction system of claim 15, wherein the at least one terminal device instruction, when executed by the at least one terminal device processor, further causes the terminal device to:

based on identifying the user type as an ordinary-level user, identify the first target super-resolution to be a target resolution currently selected by a user, and based on identifying the user type as an advanced-level user, identify the first target super-resolution to be a preset advanced playing resolution.

* * * * *